(12) United States Patent
Kim et al.

(10) Patent No.: US 8,420,152 B2
(45) Date of Patent: Apr. 16, 2013

(54) *SALICORNIA* SPP.-DERIVED SALT AND ITS PRODUCTION PROCESS

(75) Inventors: Deuk Hoi Kim, Gyeonggi-do (KR); Tae Hyun Kim, Gyeonggi-do (KR)

(73) Assignee: Phytoco Corporation, Jeollabuk-Do (KR)

( * ) Notice: Subject to any disclaimer, the term of this patent is extended or adjusted under 35 U.S.C. 154(b) by 269 days.

(21) Appl. No.: 12/598,157

(22) PCT Filed: May 7, 2008

(86) PCT No.: PCT/KR2008/002558
§ 371 (c)(1),
(2), (4) Date: Mar. 17, 2010

(87) PCT Pub. No.: WO2008/143414
PCT Pub. Date: Nov. 27, 2008

(65) Prior Publication Data
US 2010/0304000 A1    Dec. 2, 2010

(30) Foreign Application Priority Data
May 17, 2007 (KR) .................. 10-2007-0048077

(51) Int. Cl.
*A23L 1/305* (2006.01)

(52) U.S. Cl.
USPC ........... 426/649; 426/464; 426/469; 426/472; 426/478; 426/481; 426/489; 426/615; 426/648; 426/656; 426/804

(58) Field of Classification Search ................... 426/615, 426/648, 656, 464, 469, 472, 804, 478, 481, 426/489, 649
See application file for complete search history.

(56) References Cited

U.S. PATENT DOCUMENTS

| 3,228,877 | A | * | 1/1966 | Mahon ........................ 210/638 |
| 5,888,400 | A | | 3/1999 | Tholema et al. |
| 6,929,809 | B2 | | 8/2005 | Ghosh et al. |
| 2001/0021408 | A1 | | 9/2001 | Kim |
| 2001/0024676 | A1 | | 9/2001 | Kim |
| 2005/0220975 | A1 | | 10/2005 | Ghosh et al. |
| 2008/0017569 | A1 | * | 1/2008 | Ramsey et al. ............... 210/490 |

FOREIGN PATENT DOCUMENTS

| JP | 03-262457 | 11/1991 |
| KR | 2001-0083036 A | 8/2001 |
| KR | 2001-0083037 A | 8/2001 |
| KR | 2002-0038282 A | 5/2002 |

OTHER PUBLICATIONS

English language abstract of Japanese patent application publication No. JP 03-262457 (listed on accompanying PTO/SB/08A as document FP4).
"Sodium Chloride," From Wikipedia, the free encyclopedia, http://en.wikipedia.org/wiki/Sodium_chloride, last modified on Apr. 30, 2012, accessed on May 8, 2012, 10 pages.
"How to Make a Sodium Chloride Solution," From eHow, http://www.ehow.com/how_4514459_make-sodium-chloride-solution.html, accessed on May 9, 2012, 3 pages.
"Desalinization," From Water Encyclopedia, http://www.waterencyclopedia.com/Da-En/Desalinization.html, accessed on May 8, 2012, 4 pages.
Brehant et al., "Comparison of MF/UF pretreatment with conventional filtration prior to RO membranes for surface seawater desalination," *Desalination* 144: 353-360, Elsevier Science B.V., Netherlands (2002).
Crout, Teresa, "Sidney Loeb; Co-Inventor of Practical Reverse Osmosis," *Chemistry in Israel; Bulletin of the Israel Chemical Society* (8): 8-9, Israel (Dec. 2001).
International Search Report mailed Sep. 29, 2008 for International Application No. PCT/KR2008/002558, ISA/KR, 2 pgs.
English Abstract for Korean Publication No. KR2001-0083036A published Aug. 31, 2001, 1 pg (data supplied from the esp@cenet database).
English Abstract for Korean Publication No. KR2001-0083037A published Aug. 31, 2001, 1 pg (data supplied from the esp@cenet database).
English Abstract for Korean Publication No. KR2002-0038282A published May 23, 2002, 1 pg (data supplied from the esp@cenet database).

* cited by examiner

*Primary Examiner* — Helen F Heggestad
(74) *Attorney, Agent, or Firm* — Sterne, Kessler, Goldstein & Fox P.L.L.C.

(57) ABSTRACT

Disclosed herein is a salt substitute obtained from a *Salicornia* species. The salt substitute has a high content of phyto-organic minerals from a *Salicornia* species and low sodium content, which are beneficial to the health of humans. The salt substitute also contains minerals, such as potassium or magnesium, which facilitate sodium excretion from the body and thus reduce the harmful effects of sodium accumulated in the body. Further, the salt substitute has a mineral balance created by the plant's innate metabolism and tastes salty enough for use as a substitute for table salt, and contains organic nutrients including amino acids, which are nutritionally beneficial and reduce the bitterness of minerals present in large amounts, thereby providing a good taste.

14 Claims, No Drawings

SALICORNIA SPP.-DERIVED SALT AND ITS PRODUCTION PROCESS

CROSS REFERENCE TO RELATED APPLICATIONS

This application is the National Stage of International Application No. PCT/KR2008/002558, filed May 7, 2008, which claims priority to Korean Application No. 10-2007-0048077, filed May 17, 2007.

TECHNICAL FIELD

The present invention relates to a salt substitute derived from a halophyte of *Salicornia* species, and a preparation method thereof. More particularly, the present invention relates to a salt substitute from a *Salicornia* species, which contains a desired amount of sodium chloride, minerals including a proper ratio of sodium to potassium, and organic nutrients including amino acids, and a method of preparing the salt substitute.

BACKGROUND ART

Common table salt is a white crystalline solid having a salty taste, which is composed primarily of sodium chloride (NaCl). Salt is widely used as a seasoning, imparting taste to food in both Western and Eastern countries, and is also a nutrient that is essential for sustaining the body's metabolism. It helps regulate osmotic pressure and maintain acid-base balance, and is involved in the transmission of nerve impulses. Salt is also a constituent of digestive juices and is needed in many enzymatic reactions. Many recent studies, however, have revealed that excess sodium intake may contribute to hypertension, diabetes, gastric cancer, and other adult diseases.

There are various types of salt for human consumption: natural sea salt, rock salt, refined salt, artificially regenerated salt, modified salt, and processed salt. Natural sea salt is obtained from seawater, which is captured in shallow ponds and is evaporated using the natural processes of sun and wind to fully concentrate the brine. Rock salt is obtained from underground deposits of the mineral halite using a mining technique by which the rock is crushed and broken into smaller pieces, which are then screened and processed to yield rock salt having over 96% salt content. Refined salt, having a purity of over 99% sodium chloride, is created by passing seawater through an ion exchange membrane to ionize only the salt into sodium and chloride ions, evaporating moisture from the saturated brine in an evaporator, centrifuging the brine to reduce moisture, and fully drying the brine to a moisture content of 0.01% using a drier. The artificially regenerated salt is prepared by subjecting raw salt to a process including dissolution, dewatering, dryness and finally recrystallization. Modified salt is obtained by modifying raw salt through roasting, burning, melting, or the like. Processed salt contains food additives. However, the conventional salt forms are composed of mainly sodium chloride (90-99%), but rarely contain minerals that are beneficial to the health of humans.

Some functional salts having low sodium contents and supplemented with mineral nutrients including potassium are currently available on the market. For example, a low-sodium salt product, prepared from rock salt, has a sodium chloride content of about 57%, and is artificially supplemented with minerals.

Some efforts have been made to provide substitutes for table salt having high sodium content. For example, Korean Pat. Laid-Open Publication Nos. 10-2001-83036, 10-2001-83037 and 10-2002-38282 disclose a method of preparing a salt substitute from a halophyte, such as *Suaeda japonica, Suaeda maritima, Aster tripolium*, or *Salicornia europaea*. The method includes collecting *Salicornia europaea*, washing the plant with seawater or salty water to remove impurities, such as the mud of mud-flat sediment, from the plant, cutting or chopping the plant, heating the plant for over 3 hours, compressing the resulting extract, and recovering the filtrate to yield a liquid salt. To provide a crystalline salt, the pressing can be dried, placed in a ceramic container, and subjected to a three-step ashing process, which is performed at 150-250° C. for over 30 minutes, then at 500° C. for over 2 hours and finally at 700° C. for over 2 hours. In some cases, the plant is subjected directly to the ashing process without heat extraction so as to obtain a salt.

However, the salt obtained through the ashing process described in the above patent applications does not contain amino acids. Of amino acids, L-lysine in particular masks the bitter taste of sodium. For this reason, some conventional mineral salts are additionally supplemented with L-lysine.

The liquid salt described in the patent applications, which is obtained through hot water extraction and compression not undergoing an ashing process, has a sodium chloride content that is not high, and its mineral content can not be controlled.

DISCLOSURE

Technical Problem

It is therefore an object of the present invention to provide a salt substitute from a *Salicornia* species, comprising proper amounts of sodium chloride, minerals and organic nutrients including amino acids.

It is another object of the present invention to provide a salt substitute comprising a predetermined amount of potassium, which is a mineral that enhances sodium excretion from the body and thus reduces the harmful effects of sodium on the body.

It is a further object of the present invention to provide a salt substitute comprising a predetermined amount of magnesium, which is a mineral that enhances sodium excretion from the body and thus reduces the harmful effects of sodium on the body.

It is yet another object of the present invention to provide a salt substitute comprising a proper amount of sodium chloride so as to be more useful as a substitute for table salt.

It is still another object of the present invention to provide a salt substitute comprising predetermined amounts of two amino acids, L-lysine and glutamic acid, which reduce the bitterness of sodium salt.

It is still another object of the present invention to provide a salt substitute comprising minerals, including sodium chloride, and organic nutrients, including amino acids, the contents of which are modified according to the intended use so as to provide various salinity levels.

It is still another object of the present invention to provide a method of preparing a salt substitute from a *Salicornia* species so as for the salt substitute to contain a predetermined amount of sodium chloride and a high mineral content, to retain sufficient salty taste for use as a substitute for table salt, and to contain organic nutrients including amino acids.

Technical Solution

In an embodiment, the present invention provides a salt substitute from a *Salicornia* species comprising sodium chloride in an amount of 40% or greater by weight based on the total weight of the composition, minerals including sodium (Na) and potassium (K), and amino acids.

In the salt substitute according to an embodiment of the present invention, potassium and sodium may be present at a ratio ranging from 1:1.5 to 1:10 by weight based on the total weight of the composition.

In the salt substitute according to an embodiment of the present invention, potassium and sodium may be present at a ratio ranging from 1:1.5 to 1:7 by weight based on the total weight of the composition.

In the salt substitute according to an embodiment of the present invention, the amino acids may include L-lysine.

The salt substitute according to an embodiment of the present invention may be in the form of powder or granules.

In another embodiment, the present invention provides a method of preparing a salt substitute, comprising washing a plant of the genus *Salicornia*; cutting or chopping the washed plant; extracting the plant in water at 10° C. to 60° C. for 4 to 10 hours; centrifuging the extract; and passing the supernatant through an ultrafiltration membrane.

In a further embodiment, the present invention provides a method of preparing a salt substitute, comprising washing a plant of the genus *Salicornia*; cutting or chopping the washed plant; extracting the plant in hot water for 1 to 4 hours; centrifuging the extract; and passing the supernatant through an ultrafiltration membrane.

In the methods of preparing a salt substitute according to embodiments of the present invention, the washing may be performed using seawater, salty water or water.

The methods of preparing a salt substitute according to embodiments of the present invention may further include drying the filtrate. The drying may be performed through freeze-drying or spray-drying.

Advantageous Effects

In accordance with the present invention, the salt substitute according to an embodiment of the present invention has a high mineral content and a low sodium content, which are beneficial to the health of humans. The salt substitute also contains minerals, such as potassium or magnesium, which facilitate sodium excretion out of the body and thus reduce the harmful effects of sodium accumulated in the body. Further, the salt substitute tastes salty enough to be used as a substitute for table salt, and contains organic nutrients including amino acids, which are nutritionally beneficial and reduce the bitterness of minerals present in large amounts, thereby providing a good taste.

BEST MODE

Hereinafter, the present invention will be described in greater detail.

*Salicornia* species are highly salt-tolerant halophytes, which are annual grasses that grow in mud flats, salt fields or salt marshes in North America, Europe and Asia. The plant is small, usually less than 30 cm tall, and is a succulent herb having a horizontal main stem and erect lateral branches. The leaves are so small and scale-like that the plant often appears leafless. Many species are green, but their foliage turns red in autumn.

*Salicornia* species are more commonly known as glassworts in North America or samphires in Europe.

Many species of the genus *Salicornia* have been identified, including *Salicornia europaea* (also known as *Salicornia herbacea*), *Salicornia bigelovii*, *Salicornia brachiata*, *Salicornia virginica* and *Salicornia pacifica*, etc.

The *Salicornia* species have been known to be effective in overcoming fecal impaction, to relieve constipation, and to alleviate obesity due to its ability to decompose natural fats. The plant also has the effects of relieving hypertension and hypotension, softening the skin, strengthening the gastric functions, alleviating bronchial asthma and bronchitis, and lowering blood sugar levels in diabetic patients.

The *Salicornia* species have been known to contain large amounts of various minerals, present in seawater, because they are salt-tolerant herbs that grow in high salt soil, such as mud flats and salt fields. The plant has also been known to have high immune activity.

The present invention is directed to provide a salt substitute using a *Salicornia* species having such efficiencies. The salt substitute according to the present invention comprises sodium chloride in an amount of 40% or greater by weight based on the total weight of the composition, minerals, essentially including potassium and sodium at a ratio ranging from 1:1.5 to 1:10, and amino acids.

The salt substitute of the present invention is more beneficial as a substitute for table salt when it comprises sodium chloride in an amount of 70% or greater by weight.

As used herein, the term "salt substitute" refers to a substance that is capable of replacing table salt because it includes sodium chloride as a major ingredient and has a salty taste. The salt substitute of the present invention is also hereinafter referred to as a "*Salicornia*-derived salt substitute".

In the *Salicornia*-derived salt substitute of the present invention, the minerals include sodium and potassium. Potassium promotes sodium excretion from the body. In this regard, the *Salicornia*-derived salt substitute comprises potassium as a mineral at a potassium to sodium ratio of 1:1.5 to 1:10, and preferably 1:1.5 to 1:7. More preferably, the minerals further include magnesium, which, like potassium, stimulates sodium excretion from the body.

Also, the *Salicornia*-derived salt substitute of the present invention is nutritionally beneficial to the bodies of humans because it contains amino acids, and does not have the unique bitter taste of salt because it contains L-lysine in particular. L-lysine may be present in an amount of 0.10 mg/g or greater. The organic nutrients including amino acids are preferably present in amounts set so as to avoid reduction of the salty taste, which is required for the use of the salt substitute of the present invention as a substitute for table salt.

The *Salicornia*-derived salt substitute of the present invention is useful as a substitute for table salt because it retains a salty taste identical to that of table salt, does not have the unique bitter taste of salt, and possesses a sweet taste.

The *Salicornia*-derived salt substitute may be prepared through water extraction at various temperatures and/or through filtration using various membranes. Various modifications of the process can be made to vary the contents of minerals including sodium chloride and amino acids. In a preferred embodiment of the present invention, a *Salicornia*-derived salt substitute is prepared by primarily washing a plant of the genus *Salicornia* with seawater, salty water or water.

The washed *Salicornia* plant is cut or chopped so as to improve the extraction efficiency. Then, the plant is subjected to extraction in hot water for 1 to 4 hours. As used herein, the term "hot water" refers to water that is boiled at 90° C. to 100° C. Since an extraction process conducted for a long time can destroy organic nutrients contained the *Salicornia* species, the extraction is preferably carried out within the time range.

In another preferred embodiment of the present invention, the plant is subjected to extraction not in hot water but in water at 10° C. to 60° C. for 4 to 10 hours. The extraction with water at 10° C. to 60° C. results in a lower recovery of sodium chloride but yields a higher recovery of amino acids than hot-water extraction. In practice, when the two extracts are subjected to the same post-processing steps, a *Salicornia*-derived salt substitute obtained through extraction with water at 10° C. to 60° C. has a sodium chloride content about 3% to 10% less than that of a *Salicornia*-derived salt substitute obtained through hot-water extraction, but possesses about 200% to 400% greater amounts of amino acids. When the extraction with water at 10° C. to 60° C. is carried out for a short time, the extraction yield of minerals may decrease. Thus, the extraction is preferably carried out within the above time range.

In the extraction step, the water temperature may be determined depending on the desired salinity and amino acid content of a resulting *Salicornia*-derived salt substitute.

After the extraction step, the extract is centrifuged and is subjected to ultrafiltration.

The centrifuged extract yields a dried product that has a sodium chloride content of 20% or greater, contains amino acids and has an ash content of 30% or greater. However, the centrifugation step is not enough to obtain a *Salicornia*-derived salt substitute useful as a substitute for table salt. After centrifugation, a further step of ultrafiltration may yield a *Salicornia*-derived salt substitute that has a sodium chloride content of 40% or greater in a dried product, or has a sodium chloride content of 70% or greater in a dried product, which is required for use as a salt substitute.

Ultrafiltration can eliminate particles having a molecular weight ranging from approximately 5,000 to 300,000 daltons, such as bacteria, colloids, proteins and high molecular weight organic matter. An ultrafiltration membrane ranging from 3,000 to 300,000 daltons is suitable for use in this invention so as to obtain desired contents of sodium chloride, minerals and/or amino acids. The use of an ultrafiltration membrane having a larger pore size reduces the mineral content and increases the content of organics, such as colloids, fats, and proteins.

In a further embodiment of the present invention, the filtrate further undergoes a drying step to provide a *Salicornia*-derived salt substitute in the form of powder or granules.

Examples of drying include, but are not limited to, drying under reduced pressure, spray drying, thin film vacuum drying, ambient drying, and freeze drying.

It will be obvious to those skilled in the art that the dried product is further processed, for example, through suitable pulverization.

The *Salicornia*-derived salt substitute obtained according to the aforementioned process has no bitterness because it contains natural amino acids, especially L-lysine and glutaminic acid, even though it is not supplemented with food additive acids and/or salts thereof to reduce the bitterness of sodium chloride. As well, the salt substitute of the present invention does not require the artificial addition of minerals because it contains many natural minerals including sodium, potassium, magnesium, copper, calcium, iron, manganese and zinc. In particular, the salt substitute contains potassium and/or magnesium, which promote sodium excretion out of the body.

MODE FOR INVENTION

A better understanding of the present invention may be obtained through the following examples which are set forth to illustrate, but are not to be construed as the limit of the present invention.

Example 1

Dried herbs of *Salicornia europaea* were collected from Yeonggwang, Chollanam-do, South Korea, washed with seawater or 3% to 4% salt water, and cut into a size of 2 to 100 mesh.

Then, the herbs were subjected to extraction in water at 100° C. for 3 hrs.

The extract was centrifuged at 5,000 rpm at room temperature for 15 min, and passed through an ultrafiltration membrane of 3,000 daltons.

The filtrate was freeze-dried to yield a *Salicornia*-derived salt substitute.

Example 2

A herbal extract was obtained according to the same method as in Example 1, centrifuged, and passed through an ultrafiltration membrane of 5,000 daltons.

The filtrate was spray-dried to yield a *Salicornia*-derived salt substitute.

Example 3

Dried herbs of *Salicornia europaea* were collected from Yeonggwang, Chollanam-do, South Korea, washed with water, seawater or 3% to 4% salty water, and cut into a size of 2 to 100 mesh.

Then, the herbs were subjected to extraction in water at 15° C. for 6 hrs.

The extract was centrifuged at 5,000 rpm at room temperature for 15 min, and passed through an ultrafiltration membrane of 5,000 daltons.

The filtrate was spray-dried to yield a *Salicornia*-derived salt substitute.

Example 4

A herbal extract was obtained according to the same method as in Example 1, centrifuged at 5,000 rpm at room temperature for 15 min, and passed through an ultrafiltration membrane of 10,000 daltons.

The filtrate was spray-dried to yield a *Salicornia*-derived salt substitute.

Example 5

A herbal extract was obtained according to the same method as in Example 3, centrifuged at 5,000 rpm at room temperature for 15 min, and passed through an ultrafiltration membrane of 10,000 daltons.

The filtrate was spray-dried to yield a *Salicornia*-derived salt substitute.

Reference Example 1

A herbal extract was obtained according to the same method as in Example 1, and centrifuged at 3,000 rpm at room temperature for 15 min.

The supernatant was spray-dried to yield a *Salicornia*-derived salt substitute.

Reference Example 2

A herbal extract was obtained according to the same method as in Example 3, and centrifuged at 5,000 rpm at room temperature for 15 min.

The supernatant was spray-dried to yield a *Salicornia*-derived salt substitute.

Reference Example 3

A herbal extract was obtained according to the same method as in Reference Example 2, except that extraction was carried out using water at 25° C., and centrifuged at 10,000 rpm at room temperature for 15 min.

The supernatant was spray-dried to yield a *Salicornia*-derived salt substitute.

Experimental Example 1

Component Analysis

The *Salicornia*-derived salt substitutes, prepared in Examples 1 to 5 and Reference Examples 1 to 3, were analyzed for their composition in order to evaluate their usefulness as a substitute for table salt. The component analysis was conducted by the Korea Advanced Food Research Institute of the Korea Food Industry Association, the Research Center for Bio-Food Materials of Chonbuk National University, and Seoul National University of Technology. The results are given in Tables 1 to 4, below.

TABLE 1

| | Example | | | | | Reference Example | | |
|---|---|---|---|---|---|---|---|---|
| | 1 | 2 | 3 | 4 | 5 | 1 | 2 | 3 |
| Sodium chloride (%) | 87.42 | 80.03 | 76.05 | 53.25 | 50.62 | 24.12 | 31.75 | 32.03 |
| Total chlorine (%) | 54.32 | 47.62 | 42.30 | 36.56 | 33.81 | 14.35 | 18.89 | 19.06 |
| Moisture (%) | 1.52 | 1.60 | 1.75 | 3.31 | 3.29 | 2.64 | 2.52 | 2.84 |
| Insolubles (%) | 0.01 | 0.01 | 0.01 | 0.03 | 0.05 | 2.24 | 2.88 | 3.66 |
| Sulphate (%) | 0.03 | 0.04 | 0.05 | 0.04 | 0.04 | 0.06 | 0.04 | 0.03 |
| Sand powder (%) | 0.02 | 0.03 | 0.03 | 0.06 | 0.07 | 0.05 | 0.04 | 0.05 |

As shown in Table 1, the *Salicornia*-derived salt substitutes according to the present invention were found to have a sodium chloride content of 40% or greater by weight. In particular, the salt substitutes of Examples 1 to 3 had a sodium chloride of 70% or greater by weight, and were thus considered useful as a substitute for table salt.

In addition, the hot-water extraction provided a *Salicornia*-derived salt substitute having a higher content of sodium chloride compared to extraction with water at normal temperature.

The contents of moisture, crude ash, crude fats and crude proteins in the *Salicornia*-derived salt substitutes are listed in Table 2, below.

TABLE 2

| | Example | | | | | Reference Example | | |
|---|---|---|---|---|---|---|---|---|
| | 1 | 2 | 3 | 4 | 5 | 1 | 2 | 3 |
| Moisture (%) | 1.52 | 1.60 | 1.75 | 3.31 | 3.29 | 2.64 | 2.52 | 2.84 |
| Crude ash (%) | 91.21 | 84.13 | 80.12 | 72.63 | 71.10 | 34.26 | 37.68 | 42.13 |
| Crude fat (%) | 1.42 | 1.56 | 1.28 | 1.51 | 1.36 | 2.73 | 2.91 | 2.14 |
| Crude protein (%) | 2.34 | 4.53 | 2.17 | 5.82 | 5.21 | 13.25 | 10.32 | 11.72 |

The mineral composition and content of the *Salicornia*-derived salt substitutes are given in Table 3, below.

TABLE 3

| | Example | | | | | Reference Example | | |
|---|---|---|---|---|---|---|---|---|
| | 1 | 2 | 3 | 4 | 5 | 1 | 2 | 3 |
| Sodium (mg/100 g) | 48512.34 | 42047.00 | 35320.00 | 25420.00 | 23720.00 | 11487.13 | 11852.66 | 15252.46 |
| Potassium (mg/100 g) | 7248.81 | 6345.56 | 8196.00 | 5545.00 | 7498.00 | 3056.19 | 3361.27 | 3758.24 |
| Magnesium (mg/100 g) | 885.07 | 786.08 | 1459.00 | 949.00 | 1509.00 | 544.04 | 575.27 | 669.02 |
| Copper (mg/100 g) | 1.02 | 1.90 | 0.79 | 0.36 | 0.66 | 0.29 | 0.22 | 0.77 |
| Calcium (mg/100 g) | 8.74 | 6.55 | 23.13 | 11.11 | 18.33 | 8.62 | 6.73 | 6.61 |
| Iron (mg/100 g) | 1.32 | 0.83 | 4.56 | 3.18 | 7.03 | 1.70 | 1.93 | 1.00 |
| Manganese (mg/100 g) | 4.84 | 4.43 | 11.49 | 3.56 | 12.29 | 4.28 | 2.16 | 3.66 |
| Zinc (mg/100 g) | 1.34 | 0.44 | 2.96 | 2.39 | 4.65 | 1.10 | 1.45 | 1.01 |
| Total | 56663.48 | 49192.79 | 45017.93 | 31934.60 | 32769.96 | 15103.37 | 15801.69 | 19692.76 |
| Sodium/potassium ratio | 6.69 | 6.63 | 4.31 | 4.58 | 3.16 | 3.76 | 3.53 | 4.06 |

As shown in Table 3, the *Salicornia*-derived salt substitutes according to the present invention were found to contain large amounts of various minerals, as well as containing potassium and magnesium, promoting sodium excretion, along with sodium. Also, the hot-water extraction yielded a *Salicornia*-derived salt substitute having a higher content of minerals compared to extraction with water at normal temperature.

The composition and content of organic matters, including amino acids, in the *Salicornia*-derived salt substitutes are given in Table 4, below.

TABLE 4

(Unit: mg/g)

| | Example | | | | | Reference Example | | |
|---|---|---|---|---|---|---|---|---|
| | 1 | 2 | 3 | 4 | 5 | 1 | 2 | 3 |
| Aspartic acid | 0.45 | 0.65 | 3.16 | 0.94 | 1.89 | 5.48 | 4.73 | 5.23 |
| Threonine | 0.34 | 0.22 | 1.65 | 0.19 | 1.02 | 2.68 | 2.58 | 2.39 |
| Serine | 0.51 | 0.43 | 1.00 | 0.42 | 0.64 | 2.86 | 2.96 | 2.48 |
| Glutamic acid | 2.21 | 2.64 | 11.17 | 3.07 | 8.73 | 7.39 | 7.23 | 8.00 |
| Proline | 0.64 | 0.42 | 3.14 | 0.59 | 2.75 | 2.86 | 2.97 | 1.38 |
| Glycine | 0.25 | 0.35 | 1.76 | 0.43 | 1.46 | 2.25 | 2.67 | 2.85 |
| Alanine | 0.45 | 0.46 | 2.50 | 0.48 | 2.11 | 3.83 | 3.64 | 2.95 |
| Cysteine | 0.01 | 0.02 | 0.06 | 0.01 | 0.01 | 0.05 | 0.00 | 0.01 |
| Valine | 0.35 | 0.38 | 2.19 | 0.38 | 1.58 | 3.09 | 3.55 | 3.83 |
| Methionine | 0.29 | 0.05 | 0.34 | 0.04 | 0.19 | 0.86 | 1.10 | 0.74 |
| Isoleucine | 0.26 | 0.25 | 1.17 | 0.26 | 1.11 | 2.25 | 2.44 | 1.24 |
| Leucine | 0.35 | 0.31 | 2.66 | 0.34 | 0.00 | 4.11 | 4.73 | 3.41 |
| Tyrosine | 0.15 | 0.16 | 0.12 | 0.22 | 2.39 | 1.68 | 1.36 | 1.81 |
| Phenylalanine | 0.38 | 0.38 | 1.79 | 0.36 | 1.02 | 2.66 | 2.28 | 2.38 |
| Histidine | 1.12 | 0.91 | 1.80 | 0.89 | 1.37 | 1.18 | 1.27 | 1.07 |
| L-lysine | 0.56 | 0.27 | 1.36 | 0.18 | 0.49 | 3.82 | 3.56 | 3.22 |
| Ammonia | 1.03 | 1.16 | 1.64 | 1.16 | 1.40 | 4.50 | 4.42 | 3.48 |
| Arginine | 0.14 | 0.13 | 0.93 | 0.15 | 0.21 | 2.66 | 3.60 | 3.32 |
| Total | 9.49 | 9.19 | 38.44 | 10.11 | 28.37 | 54.20 | 55.09 | 49.80 |

As shown in Table 4, the *Salicornia*-derived salt substitutes according to the present invention were found to contain various amino acids, especially L-lysine and glutamic acid, which mask the bitter taste of minerals. The sodium chloride-containing compositions of Reference Examples 1 to 3 also contain organic matters, such as amino acids including L-lysine, but have excess organics, which reduce the salinity and salty taste thereof, thereby not being suitable for use as a salt substitute.

Experimental Example 2

Sensory Evaluation

The *Salicornia*-derived salt substitutes, prepared in Examples 1 to 5 and Reference Examples 1 to 3, were evaluated to determine whether they had saltiness, bitterness and a fishy flavor. The evaluation was conducted with a sensory test using a test panel consisting of 20 members using conventional natural salt as a control.

Compared to the control, the saltiness, bitterness and fishy flavor were expressed as stronger, identical or weaker, and the respective numbers of panelists were recorded. The results are given in Table 5, below.

TABLE 5

|  |  | Example | | | | | Reference Example | | |
| --- | --- | --- | --- | --- | --- | --- | --- | --- | --- |
|  |  | 1 | 2 | 3 | 4 | 5 | 1 | 2 | 3 |
| Saltiness | Stronger | — | — | — | — | — | — | — | — |
|  | Identical | 15 | 13 | 12 | 8 | 9 | 2 | 0 | 3 |
|  | Weaker | 5 | 7 | 8 | 12 | 11 | 18 | 20 | 17 |
| Bitterness | Stronger | — | — | — | — | — | — | — | — |
|  | Identical | 4 | 3 | 2 | 3 | 2 | 2 | 2 | 3 |
|  | Weaker | 16 | 17 | 18 | 17 | 18 | 18 | 18 | 17 |
| Fishy flavor | Stronger | — | — | — | — | — | 18 | 19 | 17 |
|  | Identical | 19 | 20 | 20 | 20 | 20 | 2 | 1 | 3 |
|  | Weaker | — | — | — | — | — | — | — | — |

As shown in Table 5, the *Salicornia*-derived salt substitutes according to the present invention were found to have proper saltiness and less bitterness, indicating that they are good salt substitutes. In contrast, the sodium chloride-containing compositions of Reference Examples 1 to 3 were found to have a low sodium chloride content, generating weak saltiness, and to retain the fishy flavor from crude herbs. This was considered to be due to the excess content of organics, such as amino acids.

Experimental Example 3

Evaluation of Effects on Blood Pressure in Spontaneously Hypertensive Rats

The *Salicornia*-derived salt substitute according to the present invention was evaluated for its effects on hypertension. This evaluation was conducted by the Clinical Trial Center for Functional Foods of Chonbuk National University Hospital.

Spontaneously hypertensive rats (SHR) were divided into five groups. For a test period of four weeks, animals were not dosed with any salt (control), or were dosed orally with refined salt (refined salt group A and B) or with the *Salicornia*-derived salt substitute according to the present invention (groups A and B, receiving the salt substitute of the present invention) (see, Table 6). The refined salt and the *Salicornia*-derived salt substitute according to the present invention were supplied to animals at the same sodium chloride concentrations (in Table 6, A groups were fed with feed containing 2% NaCl, and B groups with feed containing 4% NaCl).

Blood pressure was measured in the caudal artery of all animals at weekly intervals before and after feeding. In brief, after each rat was placed in a holder and acclimated to being in the holder for 20 min, systolic blood pressure was measured using a Model MK-2000 BP monitor for rats and mice (Muromachi Kikai, Tokyo, Japan). The systolic blood pressure was detected using a tail cuff and a pneumatic sensor device applied to the animal's tail. The pressure and pulsation were transduced by a pneumatic pulse transducer coupled to a sphygmomanometer preamplifier, and were recorded on a polygraph.

The results are given in Table 6, below.

As is apparent from the data of Table 6, the *Salicornia*-derived salt substitute according to the present invention was found to be effective in alleviating hypertension. In detail, the refined salt elevated the blood pressure in spontaneously hypertensive rats. In contrast, the *Salicornia*-derived salt substitute suppressed the elevation of blood pressure by promoting sodium excretion from the body.

These results indicated that the *Salicornia*-derived salt substitute according to an embodiment of the present invention is useful in cooking and food preparation for providing a functional food for lowering blood pressure.

TABLE 6

(Unit: mmHg)

| Diet | Period (week) | | | | |
| --- | --- | --- | --- | --- | --- |
|  | 0 | 1 | 2 | 3 | 4 |
| Control | 169.2 ± 1.98 | 180.2 ± 3.64 | 177.8 ± 3.53 | 177.6 ± 3.46 | 176.8 ± 4.26 |
| Refined salt group A | 175.8 ± 3.43 | 194.2 ± 6.36$^{a*}$ | 179.4 ± 3.36 | 190.8 ± 5.13$^{a*}$ | 189.6 ± 4.64$^{a*}$ |
| Refined salt group B | 178.4 ± 2.58 | 188.0 ± 4.4 | 183.8 ± 2.56* | 189.2 ± 1.07$^{a*}$ | 193.6 ± 1.96$^{a*}$ |
| Group A receiving the salt substitute of the present invention | 185.6 ± 3.91 | 179.8 ± 1.07 | 170.4 ± 2.01* | 182.0 ± 7.34 | 175.0 ± 5.41b* |
| Group B receiving the salt substitute of the present invention | 181.6 ± 5.33 | 179.0 ± 1.30 | 180.8 ± 2.91 | 178.8 ± 2.08 | 173.8 ± 2.76$^{b*}$ |

Each value represents the mean ± S.D of 5 animals

The invention claimed is:

1. A salt substitute derived from a *Salicornia* species, which comprises sodium chloride in an amount of 40% or greater by weight based on a total weight of the composition, minerals including sodium (Na) and potassium (K), and amino acids.

2. The salt substitute according to claim 1, wherein the sodium chloride is present in an amount of 70% or greater by weight.

3. The salt substitute according to claim 1 or 2, wherein the potassium and sodium is present at a ratio ranging from 1:1.5 to 1:10 by weight based on the total weight of the composition.

4. The salt substitute according to claim 3, wherein the potassium and sodium is present at a ratio ranging from 1:1.5 to 1:7 by weight based on the total weight of the composition.

5. The salt substitute according to claim 1 or 2, wherein the amino acids comprise L-lysine.

6. The salt substitute of claim 5, wherein the L-lysine is present in an amount of 0.10 mg/g or greater.

7. The salt substitute according to claim 1, which is in a powder or granule form.

8. A method of preparing a salt substitute, comprising:
 washing a plant of a *Salicornia* species;
 cutting or chopping the washed plant;
 extracting the plant in water at 10° C. to 60° C. for 4 to 10 hours;
 centrifuging the resulting extract to separate the extract into a supernatant and a pellet;
 passing the supernatant through an ultrafiltration membrane; and
 drying the filtrate to prepare a dried salt substitute, wherein the dried salt substitute comprises sodium chloride in an amount of 40% or greater by weight.

9. The method according to claim 8, wherein the salt substitute contains amino acids.

10. A method of preparing a salt substitute, comprising:
 washing a plant of a *Salicornia* species;
 cutting or chopping the washed plant;
 extracting the plant in hot water for 1 to 4 hours;
 centrifuging the resulting extract to separate the extract into a supernatant and a pellet;
 passing the supernatant through an ultrafiltration membrane; and
 drying the filtrate to prepare a dried salt substitute, wherein the dried salt substitute comprises sodium chloride in an amount of 40% or greater by weight and amino acids.

11. The method according to claim 8 or 10, wherein the washing is carried out using seawater, salty water or water.

12. The method according to claim 8 or 10, wherein the drying is performed through freeze-drying or spray-drying.

13. The method according to claim 10 or 9, wherein the amino acids comprise L-lysine.

14. The method according to claim 13, wherein the L-lysine is present in an amount of 0.10 mg/g or greater.

* * * * *